(12) United States Patent
Fischer et al.

(10) Patent No.: US 6,562,478 B1
(45) Date of Patent: May 13, 2003

(54) SEALABLE MULTILAYER FILM MADE OF A GRAFTED TERPOLYMER

(75) Inventors: David Fischer, Breunigweiler (DE); Bernd Lothar Marczinke, Heiligenstein (DE); Werner Schöne, Schriesheim (DE); Franz Langhauser, Ruppertsberg (DE); Wolfgang Bidell, Mutterstadt (DE); Roland Hingmann, Landenburg (DE); Ulrich Moll, St Martin (DE); Meinolf Kersting, Neustadt (DE); Günther Schweier, Friedelsheim (DE); Peter John Vaughan Jones, Billingham (GB)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 09/701,941

(22) PCT Filed: Jun. 2, 1999

(86) PCT No.: PCT/EP99/03811

§ 371 (c)(1), (2), (4) Date: Dec. 5, 2000

(87) PCT Pub. No.: WO99/67094

PCT Pub. Date: Dec. 29, 1999

(30) Foreign Application Priority Data

Jun. 19, 1998 (DE) ......................................... 198 27 327

(51) Int. Cl.$^7$ ................................................. B32B 27/32
(52) U.S. Cl. .................. 428/516; 428/213; 264/173.15; 264/173.19
(58) Field of Search ....................... 264/173.15, 173.19; 428/516, 212, 213

(56) References Cited

U.S. PATENT DOCUMENTS

| 5,468,440 A | * | 11/1995 | McAlpin et al. ............ 264/291 |
| 6,066,701 A | * | 5/2000 | Koveal et al. ................ 526/64 |

FOREIGN PATENT DOCUMENTS

| CA | 2142521 | 8/1995 |
| DE | 195 33337 | 3/1997 |
| EP | 668 157 | 8/1995 |
| WO | 95/32235 | 11/1995 |

* cited by examiner

*Primary Examiner*—D. Lawrence Tarazano
(74) *Attorney, Agent, or Firm*—Keil & Weinkauf

(57) ABSTRACT

A sealable coextruded film is made from at least one outer layer and from at least one base layer, where the outer layer is composed of a propylene terpolymer comprising from 80 to 99.5 mol % of structural units derived from propylene, from 0.2 to 15 mol % of structural units derived from ethene or from a $C_4$–$C_6$ 1-olefin (I) and from 0.3 to 15 mol % of structural units derived from another $C_4$–$C_{12}$ 1-olefin (II) different from the $C_4$–$C_6$ 1-olefin (I), and where the propylene terpolymer has been prepared using metallocene catalysts.

12 Claims, No Drawings

SEALABLE MULTILAYER FILM MADE OF A GRAFTED TERPOLYMER

The present invention relates to a sealable coextruded film made from at least one outer layer and from at least one base layer, where the outer layer is composed of a propylene terpolymer comprising from 80 to 99.5 mol % of structural units derived from propylene, from 0.2 to 15 mol % of structural units derived from ethene or from a $C_4$–$C_6$ 1-olefin (I) and from 0.3 to 15 mol % of structural units derived from another $C_4$–$C_{12}$ 1-olefin (II) different from the $C_4$–$C_6$ 1-olefin (I), and where the propylene terpolymer has been prepared using metallocene catalysts.

The present invention also relates to a process for producing a sealable coextruded film, and also to packaging made from these sealable coextruded films.

Films made from polypropylene are widely applied in the packaging sector, where they have considerable industrial significance. This applies also, and in particular, to biaxially oriented polypropylene films (BOPP films). It is desirable in many cases here that the films should have good sealability, i.e. the films should be capable of being bonded to one another even at temperatures markedly below their crystalline melting point. It is particularly useful here for there to be a large difference between the sealing temperature required for this purpose and the crystalline melting point. Formulations which are widely used for achieving this are polypropylene coextruded films carrying outer layers with particularly low sealing temperatures. The propylene co- or terpolymers usually used here as sealable outer layer incorporate comonomers in order to lower both their crystalline melting point and the temperature required for sealing. As increasing amounts of comonomer are incorporated the sealing temperature reduces and therefore suitability as a sealing-layer material increases. However, at least in the case of conventional co- and terpolymers, i.e. those prepared with Ziegler-Natta catalysts, as comonomer content increases there is also a sharp rise in the proportion of low-molecular-weight constituents which are amorphous and therefore soluble in xylene at 25° C. This gives the polymer and film increasing tack and at the same time poorer organoleptic properties.

U.S. Pat. No. 4,692,379 describes a sealable film laminate which has a low coefficient of friction, good receptivity for water-based coatings and good optical clarity. The upper layer is composed of an ethylene-propylene copolymer or of a terpolymer or of a mixture, while the core layer is composed of polypropylene. A lower outer layer is composed of the material used for the upper outer layer. The terpolymer is composed of 1-butene, 3.6% by weight of ethene and from 86 to 93% by weight of propylene. No mention is made of metallocene catalysts.

Compared with conventional copolymers, propylene copolymers prepared with metallocene catalysts have a significantly lower proportion of xylene-soluble constituents and therefore have particular suitability as sealing-layer materials (WO-A 95/32235, EP-A 668 157 and DE-A 19 53 33 37). The adhesion of metals and printing inks to outer layers made from metallocene-catalyzed copolymers is, furthermore, significantly better and coextruded films with outer layers of this type additionally have very good optical properties, such as high transparency and high gloss.

However, for some application sectors it is desirable to be able to use sealable coextruded films which have a still further increased difference between sealing temperature and crystalline melting point of the sealing layer, and moreover have further improved organoleptic properties. Their gloss, transparency and adhesion should be just as good as those of the coextruded films currently known and comprising propylene copolymers prepared using metallocene catalysts.

It is an object of the present invention, starting from the currently known sealable coextruded films based on propylene copolymers prepared using metallocene catalysts, to develop sealable coextruded films which are further improved by a reduced sealing temperature and in their organoleptic properties.

We have found that this object is achieved by means of the sealable coextruded films defined at the outset.

A process has moreover been found for producing the novel sealable coextruded films, as has packaging made from the sealable coextruded films.

The novel sealable coextruded film comprises at least one outer layer and at least one base layer, where the outer layer is composed of a propylene terpolymer.

The propylene terpolymers present in the novel sealable coextruded films have from 80 to 99.5 mol % of structural units derived from propylene, preferably from 85 to 99 mol %, in particular from 87 to 98 mol %, and also from 0.2 to 15 mol % of structural units derived from ethene or from a $C_4$–$C_6$ 1-olefin (I), preferably from 0.5 to 13 mol %, in particular from 0.5 to 10 mol %, and also from 0.3 to 15 mol % of structural units derived from another $C_4$–$C_{12}$ 1-olefin (II) different from the $C_4$–$C_6$ 1-olefin (I), preferably from 0.3 to 12 mol %, in particular from 0.3 to 10 mol %. The total of the molar percentages here is always 100.

Examples of suitable $C_4$–$C_6$ 1-olefines (I) are 1-butene, 1-pentene, 4-methyl-1-pentene and 1-hexene. Use is preferably made of 1-butene, 1-pentene or 1-hexene.

For the purposes of the invention, $C_4$–$C_{12}$ 1-olefines (II) are particularly 1-butene, 1-pentene, 4-methyl-1-pentene, 1-hexene, 1-heptene or 1-octene, where particular preference is given to the use of 1-butene, 1-pentene and 1-hexene.

The melting point ($T_M$) of the propylene terpolymers used, determined from the DSC peak, is less than 135° C., in particular less than 130° C. More than 80% of the monomer units present in the propylene terpolymers are arranged isotactically.

The propylene terpolymers moreover have a weight-average molar mass ($M_W$) of greater than 80,000 g/mol, in particular greater than 150,000 g/mol. The weight-average molar mass ($M_W$) here is determined by gel permeation chromatography. The enthalpy of fusion of the propylene terpolymers is greater than 20 J/g, in particular greater than 50 J/g.

The propylene terpolymers to be used according to the invention also have, inter alia, a proportion of regioregular '1-2'-inserted propylene units, given by the formula (1)

$$\frac{['1\text{-}2']}{['1\text{-}2'] + ['2\text{-}1'] + ['1\text{-}3']} \tag{1}$$

of greater than 0.97, in particular of greater than 0.99. The regioregular '1-2'-insertion of propene and also the regioirregular '2-1'-insertion and the likewise regioirregular '1-3'-insertion, are known, inter alia, from P. Pino et al., Angew. Chemie 92, (1980) 869 and from A. Zambelli et al., Macromolecules 21, (1988) 617.

The respective proportions of regioregular '1-2'-insertion and regioirregular '2-1'-insertion, and also of regioirregular '1-3'-insertion are determined, inter alia, by $^{13}C$ NMR spectroscopy, as described in A. Zambelli et al., Macromolecules 21, (1988) 617.

The xylene-soluble fraction ($X_L$) in % by weight of the propylene terpolymers obeys the following expression (2)

$$X_L \leq 1411.21 \exp(-0.0591 T_M) - 0.05 \tag{2}$$

where $T_M$ is the melting point of the propylene terpolymers in °C.

Preferred propylene terpolymers to be used according to the invention also have polydispersity ($M_W/M_N$) of less than 2.25, specifically of less than 2.1 and in particular of less than 2.0. The polydispersity ($M_W/M_N$) is preferably determined with the aid of gel permeation chromatography using 1,2,4-trichlorobenzene as solvent.

The propylene terpolymers to be used according to the invention are prepared using metallocene catalysts, preferably by a process which comprises polymerizing the comonomers in the presence of a metallocene catalyst system which has A) an inorganic or organic support, B) at least one metallocene complex, and C) at least one metallocenium-ion-forming compound, where, however, the use of two different aluminoxanes as component C) is excluded.

The metallocene catalyst system used in this process may moreover comprise, besides components A), B) and C), at least one organic metal compound of an alkali metal or alkaline-earth metal or of a metal of the 3rd main group of the periodic table.

The polymerization to prepare the propylene terpolymers used in the novel sealable coextruded films takes place with the aid of metallocene catalyst systems of this type at from −50 to 300° C., preferably from 0 to 150° C., and at pressures in the range from 0.5 to 3000 bar, preferably from 1 to 100 bar. In this process, which is also novel, the residence times of each of the reaction mixtures should be set at from 0.5 to 5 hours, in particular at from 0.7 to 3.5 hours. It is also possible in the polymerization to make concomitant use of, inter alia, antistats, and also molar mass regulators, for example hydrogen. Small amounts, i.e. less than 0.5 mol %, of yet other $C_4-C_{12}$ 1-olefins may also be copolymerized in the polymerization.

The polymerization may be carried out in solution, in suspension, in liquid monomers or in the gas phase. It is preferably carried out in liquid monomers (bulk process) or in the gas phase, an agitated gas phase being preferred.

The process, which is also novel, may be carried out either continuously or else batchwise. Examples of suitable reactors are continuous stirred tank reactors and loop reactors. It is also possible, if desired, to use a series, placed one after the other, of stirred tank reactors or of loop reactors (a reactor cascade).

The metallocene catalyst systems used comprise, as component A), an inorganic or organic support. The inorganic support used here may also be a suitable inorganic oxide which has a pH, determined by the method of S. R. Morrison, The Chemical Physics of Surfaces, Plenum Press, New York [1977], pages 130 ff., of from 1 to 6 and which has cavities and channels whose macroscopic proportion by volume of the entire particle is in the range from 5 to 30%. Use may preferably be made here in particular of inorganic oxides whose pH, i.e. whose negative decadic logarithm of proton concentration, is in the range from 2 to 5.5.

Inorganic supports used are in particular also inorganic oxides which have an average particle diameter of from 5 to 200 μm, in particular from 20 to 90 μm, and an average particle diameter of the primary particles of from 0.1 to 20 μm, in particular from 0.1 to 5 μm. The particles termed primary particles here are porous, granular particles. The primary particles have pores with a diameter of in particular from 1 to 1000 Å. A feature, inter alia, of the inorganic oxides to be used is also that they have cavities and channels with an average diameter of from 0.1 to 20 μm, in particular from 1 to 15 μm. The inorganic oxides moreover in particular also have a pore volume of from 0.1 to 10 cm³/g, preferably from 1.0 to 5.0 cm³/g, and a specific surface area of from 10 to 1000 m²/g, preferably from 100 to 500 m²/g. Finely divided inorganic oxides of this type can be obtained, inter alia, by spray-drying of ground hydrogels, and can also be purchased commercially.

Particularly preferred inorganic supports are oxides of silicon, of aluminum, of titanium, or of one of the metals of the 1st or the 2nd main group of the periodic table. A very particularly preferred inorganic oxide, besides alumina, magnesium oxide and phyllosilicates, is silica gel ($SiO_2$).

Cogels, i.e. mixtures of at least two different inorganic oxides, may also be used as component A).

Catalyst component A) may also be an organic support, for example a thermoplastic polymer. Preferred organic supports here are polymers of 1-alkenes, in particular propene homopolymers or propene copolymers, or also ethene homopolymers or ethene copolymers. It is also possible to use polymers of styrene.

It is preferable to use from 0.1 to 10,000 μmol, in particular from 5 to 200 μmol, of the metallocene complex, i.e. of component B), per gram of support, i.e. of component A).

The metallocene catalyst system used comprises, as component B), at least one metallocene complex. Particularly suitable metallocene complexes have the formula (I)

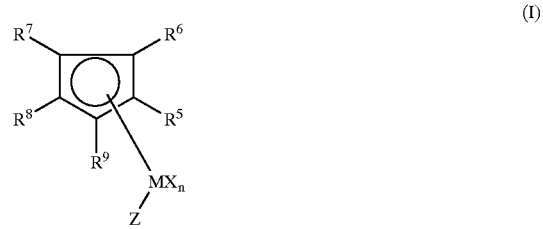

(I)

where:

M is titanium, zirconium, hafnium, vanadium, niobium or tantalum, or also elements of the 3rd subgroup of the periodic table and the lanthanoids, X is fluorine, chlorine, bromine, iodine, hydrogen, $C_1-C_{10}$-alkyl, $C_6-C_{15}$-aryl, alkylaryl having from 1 to 10 carbon atoms in the alkyl radical and from 6 to 20 carbon atoms in the aryl radical, $-OR^{10}$ or $-NR^{10}R^{11}$, n is an integer from 1 to 3, where n corresponds to the value of M minus the number 2, where $R^{10}$ and $R^{11}$ are $C_1-C_{10}$-alkyl, $C_6-C_{15}$-aryl, alkylaryl, arylalkyl, fluoroalkyl or fluoroaryl, with in each case from 1 to 10 carbon atoms in the alkyl radical and from 6 to 20 carbon atoms in the aryl radical, $R^5$ to $R^9$ are hydrogen, $C_1-C_{10}$-alkyl, 5- to 7-membered cycloalkyl, which in turn may carry a $C_1-C_{10}$-alkyl substituent, $C_6-C_{15}$-aryl or arylalkyl, where, if desired, two adjacent radicals may also jointly be a saturated or unsaturated cyclic group having from 4 to 15 carbon atoms, which may in turn be substituted with a $C_1-C_8$-alkyl or $C_6-C_{10}$-aryl or $C_7-C_{20}$-arylalkyl group, or are $Si(R^{12})_3$, where $R^{12}$ is $C_1$–$C_{10}$-alkyl, $C_3$–$C_{10}$-cycloalkyl or $C_6$–$C_{15}$-aryl, Z is X or

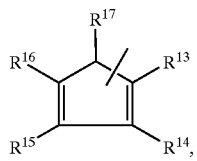

where $R^{13}$ to $R^{17}$ are hydrogen, $C_1$–$C_{10}$-alkyl, 5- to 7-membered cycloalkyl, which in turn may carry a $C_1$–$C_{10}$-alkyl substituent, $C_6$–$C_{15}$-aryl or arylalkyl, and where, if desired, two adjacent radicals may also jointly be a saturated or unsaturated cyclic group having from 4 to 15 carbon atoms, which in turn may be substituted with a $C_1$–$C_8$-alkyl or $C_6$–$C_{20}$-aryl or $C_7$–$C_{20}$-arylalkyl group, or are $Si(R^{18})_3$, where $R^{18}$ is $C_1$–$C_{10}$-alkyl, $C_6$–$C_{15}$-aryl or $C_3$–$C_{10}$-cycloalkyl, or where $R^8$ and Z jointly form a grouping —$R^{19}$—A—, where $R^{19}$ is

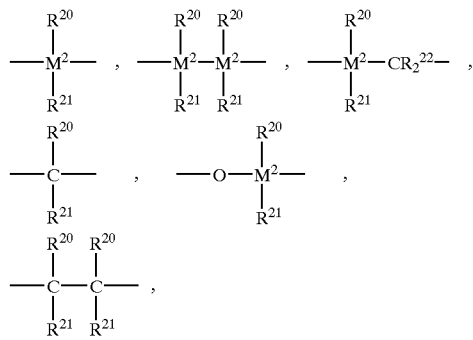

=$BR^{20}$, =$AlR^{20}$, —Ge—, —Sn—, —O—, —S—, =SO, =$SO_2$, =$NR^{20}$, =CO, =$PR^{20}$ or =$P(O)R^{20}$, where $R^{20}$, $R^{21}$ and $R^{22}$ are identical or different and are hydrogen, halogen, $C_1$–$C_{10}$-alkyl, $C_1$–$C_{10}$-fluoroalkyl, $C_6$–$C_{10}$-fluoroaryl, $C_6$–$C_{10}$-aryl, $C_1$–$C_{10}$-alkoxy, $C_2$–$C_{10}$-alkenyl, $C_7$–$C_{40}$-arylalkyl, $C_8$–$C_{40}$-aryl-alkenyl or $C_7$–$C_{40}$-alkylaryl, or where two adjacent radicals, in each case with the atoms linking them, form a ring, and $M^2$ is silicon, germanium or tin, A is

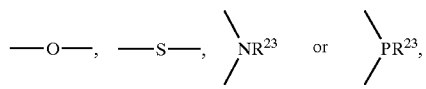

where $R^{23}$ is $C_1$–$C_{10}$-alkyl, $C_6$–$C_{15}$-aryl, $C_3$–$C_{10}$-cycloalkyl, alkylaryl or $Si(R^{24})_3$, and $R^{24}$ is hydrogen, $C_1$–$C_{10}$-alkyl, $C_6$–$C_{15}$-aryl, which may in turn be substituted with $C_1$–$C_4$-alkyl groups, or is $C_3$–$C_{10}$-cycloalkyl, or where $R^8$ and $R^{16}$ jointly form a grouping —$R^{19}$—.

Among the metallocene complexes of the formula I, preference is given to

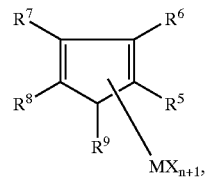
Ia

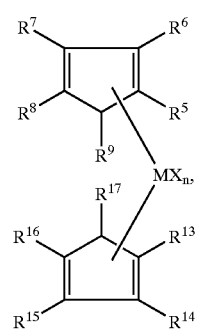
Ib

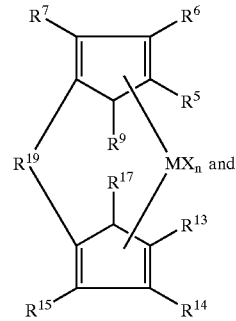
Ic

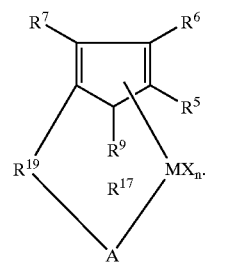
Id

The radicals X may be identical or different. They are preferably identical.

Among the compounds of the formula Ia, particular preference is given to those in which M is titanium, zirconium or hafnium, X is chlorine, $C_1$–$C_4$-alkyl or phenyl, n is the number 2, and $R^5$ to $R^9$ are hydrogen or $C_1$–$C_4$-alkyl.

Among the compounds of the formula Ib, particular preference is given to those in which M is titanium, zirconium or hafnium, X is chlorine, $C_1$–$C_4$-alkyl or phenyl, n is the number 2, $R^5$ to $R^9$ are hydrogen, $C_1$–$C_4$-alkyl or $Si(R^{12})_3$, and $R^{13}$ to $R^{17}$ are hydrogen, $C_1$–$C_4$-alkyl or $Si(R^{18})_3$.

Particularly suitable compounds of the formula Ib are those in which the cyclopentadienyl radicals are identical.

Examples of particularly suitable compounds are bis(cyclopentadienyl)zirconium dichloride,
bis(pentamethylcyclopentadienyl)zirconium dichloride,
bis(methylcyclopentadienyl)zirconium dichloride,
bis(ethylcyclopentadienyl)zirconium dichloride,
bis(n-butylcyclopentadienyl)zirconium dichloride and
bis(trimethylsilylcyclopentadienyl)zirconium dichloride, and also the corresponding dimethylzirconium compounds.

Among the compounds of the formula Ic, particular preference is given to those in which $R^5$ and $R^{13}$ are identical and are hydrogen or $C_1$–$C_{10}$-alkyl, $R^9$ and $R^{17}$ are identical and are hyrogen, methyl, ethyl, isopropyl or tert-butyl, $R^6$, $R^7$, $R^{14}$ and $R^{15}$ are as follows:
$R^7$ and $R^{15}$ are $C_1$–$C_4$-Alkyl,
$R^6$ and $R^{14}$ are hydrogen,
or two adjacent radicals $R^6$ and $R^7$, or also $R^{14}$ and $R^{15}$, together are a cyclic group having from 4 to 18 carbon atoms,

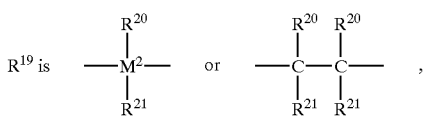

M is titanium, zirconium or hafnium, and
X is chlorine, $C_1$–$C_4$-alkyl or phenyl.

Examples of particularly suitable complex compounds are dimethylsilanediylbis(cyclopentadienyl)zirconium dichloride,
dimethylsilanediylbis(indenyl)zirconium dichloride,
dimethylsilanediylbis(tetrahydroindenyl)zirconium dichloride,
ethylenebis(cyclopentadienyl)zirconium dichloride,
ethylenebis(indenyl)zirconium dichloride,
ethylenebis(tetrahydroindenyl)zirconium dichloride,
tetramethylethylene-9-fluorenylcyclopentadienylzirconium dichloride,
dimethylsilanediylbis(3-tert-butyl-5-methylcyclopentadienyl)zirconium dichloride,
dimethylsilanediylbis(3-tert-butyl-5-ethylcyclopentadienyl)zirconium dichloride,
dimethylsilanediylbis(2-methylindenyl)zirconium dichloride,
dimethylsilanediylbis(2-isopropylindenyl)zirconium dichloride,
dimethylsilanediylbis(2-tert-butylindenyl)zirconium dichloride,
diethylsilanediylbis(2-methylindenyl)zirconium dibromide,
dimethylsilanediylbis(3-methyl-5-methylcyclopentadienyl)zirconium dichloride,
dimethylsilanediylbis(3-ethyl-5-isopropylcyclopentadienyl)zirconium dichloride,
dimethylsilanediylbis(2-ethylindenyl)zirconium dichloride,
dimethylsilanediylbis(2-methylbenzindenyl)zirconium dichloride
dimethylsilanediylbis(2-ethylbenzindenyl)zirconium dichloride,
methylphenylsilanediylbis(2-ethylbenzindenyl)zirconium dichloride,
methylphenylsilanediylbis(2-methylbenzindenyl)zirconium dichloride,
diphenylsilanediylbis(2-methylbenzindenyl)zirconium dichloride,
diphenylsilanediylbis(2-ethylbenzindenyl)zirconium dichloride,
and diphenylsilanediylbis(2-methylindenyl)hafnium dichloride, and also the corresponding dimethylzirconium compounds.

Other examples of suitable complex compounds are dimethylsilanediylbis(2-methyl-4-phenylindenyl)zirconium dichloride,
dimethylsilanediylbis(2-methyl-4-naphthylindenyl)zirconium dichloride,
dimethylsilanediylbis(2-methyl-4-isopropylindenyl)zirconium dichloride and
dimethylsilanediylbis(2-methyl-4,6-diisopropylindenyl)zirconium dichloride and also the corresponding dimethylzirconium compounds.

Among the compounds of the formula Id, particular preference is given to those in which M is titanium or zirconium, X is chlorine, $C_1$–$C_4$-alkyl or phenyl,

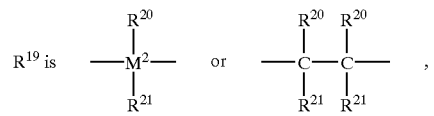

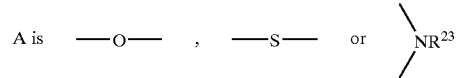

and $R^5$ to $R^7$ and $R^9$ are hydrogen, $C_1$–$C_{10}$-alkyl, $C_3$–$C_1$-cycloalkyl, $C_6$–$C_{15}$-aryl or $Si(R^{12})_3$, or where two adjacent radicals are a cyclic group having from 4 to 12 carbon atoms.

Complex compounds of this type may be synthesized by methods known per se, preferably reacting the correspondingly substituted cyclic hydrocarbon anions with halides of titanium, zirconium, hafnium, vanadium, niobium or tantalum.

Examples of corresponding preparation processes are described, inter alia, in Journal of Organometallic Chemistry, 369 (1989), 359–370.

It is also possible to use mixtures of different metallocene complexes.

The metallocene catalyst system to be used in the preferred preparation process comprises, as component C), at least one metallocenium-ion-forming compound. However, the use of two different aluminoxanes as component C) is excluded here.

Suitable metallocenium-ion-forming compounds are strong, neutral Lewis acids, ionic compounds with Lewis-acid cations and ionic compounds with Brönsted acids as cation.

Preferred strong, neutral Lewis acids are compounds of the formula II $$M^3X^1X^2X^3 \qquad\qquad \text{II}$$

where $M^3$ is an element of the 3rd main group of the periodic table, in particular B, Al or Ga, preferably B, $X^1$, $X^2$ and $X^3$ are hydrogen, $C_1$–$C_{10}$-alkyl, $C_6$–$C_{15}$-aryl, alkylaryl, arylalkyl, haloalkyl or haloaryl with in each case from 1 to 10 carbon atoms in the alkyl radical and from 6 to 20 carbon atoms in the aryl radical, or fluorine, chlorine, bromine or iodine, in particular haloaryls, preferably pentafluorophenyl.

Particular preference is given to compounds of the formula II in which $X^1$, $X^2$ and $X^3$ are identical, preferably tris(pentafluorophenyl)borane.

Suitable ionic compounds with Lewis-acid cations are those of the formula III $$[(Y^{a+})Q_1Q_2 \ldots Q_z]^{d+} \qquad \text{III}$$

where

Y is an element of the 1st to 6th main group or of the 1st to 8th subgroup of the periodic table, $Q_1$ to $Q_z$ are singly negatively charged radicals, such as $C_1$–$C_{28}$-alkyl, $C_6$–$C_{15}$-aryl, alkylaryl, arylalkyl, haloalkyl or haloaryl, with in each case from 6 to 20 carbon atoms in the aryl radical and from 1 to 28 carbon atoms in the alkyl radical, or $C_3$–$C_{10}$-cycloalkyl, either unsubstituted or substituted with $C_1$–$C_{10}$-alkyl groups, or halogen, $C_1$–$C_{28}$-alkoxy, $C_6$–$C_{15}$-aryloxy, silyl or mercaptyl, a is an integer from 1 to 6, z is an integer from 0 to 5, and d is the difference a–z, with the proviso that d is equal to or greater than 1.

Particularly suitable ionic compounds are carbonium cations, oxonium cations and sulfonium cations, and also cationic transition metal complexes, in particular the triphenylmethyl cation, the silver cation and the 1,1'-dimethylferrocenyl cation. They preferably have non-coordinating gegenions, in particular boron compounds, as also mentioned in WO-A 91/09882, preferably tetrakis(pentafluorophenyl)borate.

Ionic compounds with Brönsted acids as cations and likewise preferably non-coordinating gegenions are mentioned in WO-A 91/09882. A preferred cation is N,N-dimethylanilinium.

The amount used of the metallocenium-ion-forming compound C) is preferably from 0.1 to 10 equivalents, based on the metallocene complex I.

Particularly suitable metallocenium-ion-forming compounds C) are open-chain or cyclic aluminoxane compounds of the formula IV or V

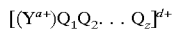

IV

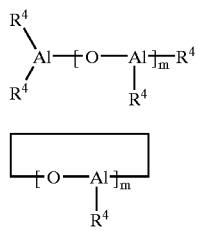

V where $R^4$ is $C_1$–$C_4$-alkyl, preferably methyl or ethyl, and m is an integer from 5 to 30, preferably from 10 to 25.

These oligomeric aluminoxane compounds are usually prepared by reacting a solution of an aluminum trialkyl compound with water. The preparation is described, inter alia, in EP-A 284 708 and U.S. Pat. No. 4,794,096.

The resultant oligomeric aluminoxane compounds are generally mixtures of chain molecules of different length, both linear and cyclic, and m therefore has to be regarded as an average value. The aluminoxane compounds may also be present in a mixture with other metal alkyl compounds, preferably with aluminum alkyl compounds.

The presence of two different aluminoxanes of the formula IV or V as metallocenium-ion-forming compounds C) in the metallocene catalyst system used is excluded. Different aluminoxanes here are regarded as aluminoxanes of the formulae IV or V which have different radicals $R^4$.

Both the metallocene complexes (component B)) and the metallocenium-ion-forming compound (component C)) are preferably used in solution, and for this particular preference is given to aromatic hydrocarbons having from 6 to 20 carbon atoms, in particular xylenes and toluene.

Other compounds which may be used as component C) are aryloxyaluminoxanes, as described in U.S. Pat. No. 5,391,793, aminoaluminoxanes, as described in U.S. Pat. No. 5,371,260, aminoaluminoxane hydrochlorides, as described in EP-A 633 264 and siloxyaluminoxanes, as described in EP-A 621 279.

It has proven advantageous for the amounts used of the metallocene complexes and the oligomeric aluminoxane compound to be such that the atomic ratio of aluminum from the oligomeric aluminoxane compound to the transition metal from the metallocene complexes is in the range from 10:1 to $10^6$:1, in particular from 10:1 to $10^4$:1.

The metallocene catalyst system which is used to prepare the propylene terpolymers used in the novel sealable coextruded films may, if desired, comprise, as component D), another metal compound of the formula VI

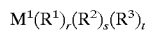

VI where $M^1$ is an alkali metal, an alkaline-earth metal or a metal of the 3rd main group of the periodic table, i.e. boron, aluminum, gallium, indium or thallium, $R^1$ is hydrogen, $C_1$–$C_{10}$-alkyl, $C_6$–$C_{15}$-aryl, alkylaryl or arylalkyl, in each case having from 1 to 10 carbon atoms in the alkyl radical and from 6 to 20 carbon atoms in the aryl radical, $R^2$ and $R^3$ are hydrogen, halogen, $C_1$–$C_{10}$-alkyl, $C_6$–$C_{15}$-aryl, alkylaryl, arylalkyl or alkoxy, in each case having from 1 to 10 carbon atoms in the alkyl radical and from 6 to 20 carbon atoms in the aryl radical, r is an integer from 1 to 3, and s and t are integers from 0 to 2, where the total r+s+t corresponds to the value of $M^1$.

Among the metal compounds of the formula VI, preference is given to those in which $M^1$ is lithium, magnesium or aluminum, and $R^1$ to $R^3$ are $C_1$–$C_{10}$-alkyl.

Particularly preferred metal compounds of the formula VI are n-butyllithium, n-butyl-n-octylmagnesium, n-butyl-n-heptyl-magnesium, tri-n-hexylaluminum, triisobutylaluminum, triethylaluminum and trimethylaluminum.

If component D) is used it is preferably present in the catalyst system in an amount of from 800:1 to 1:1, in particular from 500:1 to 50:1 (molar ratio of $M^1$ in formula VI to transition metal M in formula I).

Components A), B), C) and, if desired, D) are used together as a metallocene catalyst system.

The base layer of the novel sealable coextruded film comprises in particular a polyolefin, preferably a propylene polymer, and, if desired, effective amounts of other additives. The base layer generally comprises at least 50% by weight, preferably from 75 to 100% by weight, in particular from 90 to 100% by weight, of the propylene polymer.

The propylene polymer generally comprises from 90 to 100% by weight, preferably from 95 to 100% by weight, in particular from 98 to 100% by weight, of propylene, and generally has a melting point of 120° C. or above, preferably from 150 to 170° C., and generally a melt flow rate of from 0.5 g/10 min to 8 g/10 min, preferably from 2 g/10 min to 5 g/10 min at 230° C. and with a load of 21.6 kg (DIN 53 735). Preferred propylene polymers for the base layer are isotactic propylene homopolymer with an atactic fraction of not more than 15% by weight, copolymers of ethylene and propylene with an ethylene content of not more than 10% by weight, copolymers of propylene with $C_4$–$C_8$ α-olefins with a α-olefin content of not more than 10% by weight, and terpolymers of propylene, ethylene and butylene with an ethylene content of not more than 10% by weight and with a butylene content of not more than 15% by weight. Isotactic propylene homopolymer is particularly preferred. The percentages by weight given are based on the respective polymer.

Mixtures of the propylene homo- and/or co- and/or terpolymers with other polyolefins are also suitable, in particular those with monomers having from 2 to 6 carbon atoms. The mixtures comprise at least 50% by weight, in particular at least 75% by weight, of polypropylene. Suitable other polyolefins in the polymer mixture are polyethylenes, in particular HDPE, LDPE and LLDPE, and in each case the proportion of these polyolefins does not exceed 15% by weight, based on the polymer mixture.

For opaque, white or white-opaque films, the base layer may also comprise up to 40% by weight, preferably up to 30% by weight, based on the total weight of the base layer, of inert particulate material with an average particle diameter in the range from 0.01 to 8 μm, preferably from 0.02 to 2.5 μm. When the film is stretch-oriented at suitable temperatures the presence of the inert particulate material with a particle size of from 1 to 8 μm leads to the development, between the polymer matrix and the inert material, of microscopic cracks and microscopic cavities, known as voids, in the area of which visible light becomes refracted. This gives the film an opaque appearance making it especially suitable for particular purposes in packaging, in particular in the food and drink sector. The inert particulate material may be inorganic or organic in nature. Particularly suitable materials are, among inorganic materials, calcium carbonate, aluminum silicate, silica and titanium dioxide, and among organic materials polyethylene terephthalate, polybutylene terephthalate, polyesters, polyamides and polystyrenes. It is also possible to combine various inorganic and/or organic particles.

The modification of the base layer in the stated manner is known per se and is carried out as described in DE-A-43 11 422, which is expressly incorporated herein by way of reference. It gives detailed descriptions of types of particles, the amounts of these used, and modification by coating. In a preferred embodiment the base layer may also comprise resins and/or antistats.

The polyolefins preferably used as base layer may be prepared using the same metallocene catalyst system as that described above for the outer layer. However, it is also possible to use a Ziegler-Natta catalyst system, instead of a metallocene catalyst system, for preparing the polyolefins preferably used as base layer. Ziegler-Natta catalyst systems of this type have been disclosed, inter alia, in U.S. Pat. No. 4,857,613 and U.S. Pat. No. 5,288,824. The polydispersity ($M_W/M_N$) of the polyolefins used here as base layer may either be narrow or broadly distributed, in the range from 1.5 to 12, in particular from 1.6 to 8.

The novel sealable coextruded film is composed of at least one outer layer of thickness from 0.1 to 10 μm, in particular from 0.1 to 5 μm, and of at least one base layer of thickness from 1 to 150 μm, in particular from 1 to 100 μm.

Alternating superposition of more than one outer layer and more than one base layer is also possible, giving the novel sealable coextruded film a sandwich structure. Particularly preferred sealable coextruded films have a three-layer structure in which each of the upper and the lower layer is an outer layer and the layer between these is a base layer.

For still further improvement of certain properties of the novel sealable coextruded film, the base layer and/or the outer layer may comprise an effective amount of various additives, preferably hydrocarbon resin and/or antistats and/or antiblocking agents and/or lubricants and/or stabilizers and/or neutralizing agents, which are compatible with the polymers of the base layer and the outer layer, with the exception of the antiblocking agents, which are generally incompatible. All of the amounts given in percent by weight (% by weight) in the following description are based on the layer or layers to which the additive may be added.

A low-molecular-weight resin is preferably added to the base and/or the outer layer. Hydrocarbon resins are low-molecular-weight polymers whose molecular weight ($M_n$) is generally in a range from 300 to 8000, preferably from 400 to 5000, in particular from 500 to 2000. The molecular weight of the resins is therefore markedly lower than that of the propylene polymers which form the principal component of the individual film layers and generally have a molecular weight ($M_n$) greater than 60,000. The proportion of the resin is in a range from 1 to 30% by weight, preferably from 2 to 10% by weight. The softening point of the resin is from 100 to 180° C. (measured in accordance with DIN 1995-U4, corresponding to ASTM E-28), preferably from above 120 to 160° C. Among the numerous low-molecular-weight resins, preference is given to the hydrocarbon resins, and specifically in the form of the petroleum resins, styrene resins, cyclopentadiene resins and terpene resins. (These resins are described in Ullmanns Encyklopädie der techn. Chemie, 4th edition, Vol. 12, pages 525 to 555).

The petroleum resins are hydrocarbon resins which are prepared by polymerizing deep-decomposed petroleum materials in the presence of a catalyst. These petroleum materials usually comprise a mixture of resin-forming substances, such as styrene, methylstyrene, vinyltoluene, indene, methylindene, butadiene, isoprene, piperylene and pentylene. The. styrene resins are low-molecular-weight homopolymers of styrene or copolymers of styrene with other monomers, such as methylstyrene, vinyltoluene and butadiene. The cyclopentadiene resins are cyclopentadiene homopolymers or cyclopentadiene copolymers, obtained from coal tar distillates and fractionated petroleum gas. To prepare these resins, the materials which comprise cyclopentadiene are held for a long period at a high temperature. Depending on the reaction temperature it is possible to obtain dimers, trimers or oligomers.

The terpene resins are polymers of terpenes, i.e. hydrocarbons of the formula $C_{10}H_{16}$ which are present in almost all essential oils and in oil-containing resins from plants; phenol-modified terpene resins are included. Specific examples of terpenes are pinene, α-pinene, dipentene, limonene, myrcene, camphene and similar terpenes. The hydrocarbon resins may also be those known as modified hydrocarbon resins. The modification is generally carried out by reacting the raw materials, before the polymerization, or by introducing specific monomers, or by reacting polymerized product, in particular by hydrogenating or partially hydrogenating.

Other hydrocarbon resins used are styrene homopolymers, styrene copolymers, cyclopentadiene homopolymers, cyclopentadiene copolymers and/or terpene polymers in each case with a softening point above 135° C. (the hydrogenated product being preferred in the case of unsaturated polymers). Very particular preference is given to the use in the individual layers of the cyclopentadiene polymers with a softening point of 140° C. and above.

Preferred antistats are alkali metal alkanesulfonates, polyether-modified (i.e. ethoxylated and/or propoxylated) polydiorganosiloxanes (polydialkylsiloxanes, polyalkylphenylsiloxanes and the like) and/or the essentially straight-chain and saturated aliphatic tertiary amines which have an aliphatic radical having from 10 to 20 carbon atoms and which have substitution by $\omega$-hydroxy-$(C_1–C_4)$-alkyl groups. N,N-bis(2-Hydroxy-ethyl)alkylamines having from 10 to 20 carbon atoms, preferably from 12 to 18 carbon atoms, in the alkyl radical are particularly suitable. The effective amount of antistat is in the range from 0.05 to 0.3% by weight.

Lubricants are higher aliphatic amides, higher aliphatic esters, waxes and metal soaps, and also polydimethylsiloxanes. The effective amount of lubricant is in the range from 0.1 to 3% by weight. Addition of higher aliphatic amides in the range from 0.15 to 0.25% by weight in the base layer and/or in the outer layers is particularly suitable. A particularly suitable aliphatic amide is erucamide. The addition of polydimethylsiloxanes is preferred in the range from 0.3 to 2.0% by weight, and use is made in particular of polydimethylsiloxanes with a viscosity of from 10,000 to 1,000,000 mm$^2$/s.

The stabilizers which may be used are the usual stabilizing compounds for ethylene polymers, propylene polymers and other $\alpha$-olefin polymers. The amounts of these added are from 0.05 to 2% by weight. Phenolic stabilizers, alkali metal/alkaline-earth metal stearates and/or alkali metal/alkaline-earth metal carbonates are particularly suitable. Amounts of from 0.1 to 0.6% by weight, in particular from 0.15 to 0.3% by weight, of phenolic stabilizers are preferred, and these preferably have a molecular weight ($M_n$) greater than 500. Pentaerythritol tetrakis(3-(3,5-di-tert-butyl-4-hydroxyphenyl)propionate) or 1,3,5-trimethyl-2,4,6-tris(3,5-di-tert-butyl-4-hydroxybenzyl)-benzene are particularly advantageous.

The antiblocking agents are preferably added to the outer layers. Suitable antiblocking agents are inorganic additives, such as silica, calcium carbonate, magnesium silicate, aluminum silicate, calcium phosphate and the like and/or incompatible organic polymers, such as polyamides, polyesters, polycarbonates and the like, and preference is given to benzoguanamine-formaldehyde polymers, silica and calcium carbonate. The effective amount of antiblocking agent is in the range from 0.1 to 2% by weight, preferably from 0.1 to 0.5% by weight. The average particle size is from 1 to 6 $\mu$m, in particular from 2 to 5 $\mu$m, and particles of spherical shape, as described in EP-A-0 236 945 and DE-A-38 01 535, are particularly suitable.

Neutralizing agents are preferably calcium stearate and/or calcium carbonate of average particle size not more than 0.7 $\mu$m, absolute particle size not more than 10 $\mu$m and specific surface area not more than 40 m$^2$/g.

The invention also provides a process for preparing the novel coextruded film by the process known as coextrusion.

The procedure of this process comprises coextruding, through a flat-film die, the melts corresponding to the individual layers of the film, taking off the resultant coextruded film for solidification on one or more roll(s), and then, if desired, biaxially stretching (orienting) the film and heat-setting and then winding up the biaxially stretched or unstretched film.

In a particularly preferred process, the biaxially stretched film, after heat-setting, is corona- or flame-treated, and specifically on the surface layer intended for corona-treatment.

Biaxial stretching (orientation) is preferred and may be carried out simultaneously or in succession. Biaxial stretching in succession, in which stretching is firstly longitudinal (in the machine direction) and then transverse (perpendicular to the machine direction), is particularly useful.

Firstly, as usual in coextrusion, the polymer or the polymer mixture of the individual layers is compressed and plasticized in an extruder. The additives which may be added if desired may by this time be present in the polymer. The melts are then simultaneously extruded through a flat-film die, and the coextruded film discharged is taken off on one or more take-off rolls, whereupon it cools and solidifies.

The resultant film is then preferably stretched longitudinally and transversely to the direction of extrusion, giving an orientation of the molecule chains. The stretching in the longitudinal direction is preferably from 4:1 to 9:1, and in the transverse direction preferably from 5:1 to 11:1. The longitudinal stretching is usefully carried out with the aid of two rolls running at different speeds corresponding to the desired stretching ratio, and the transverse stretching with the aid of an appropriate tenter frame.

The biaxial stretching of the film is followed by its heat-setting (heat treatment), by holding the film for from about 0.5 to 10 seconds at from 110 to 130° C. The film is then wound up in a usual manner using wind-up equipment.

It has proven particularly useful for the take-off roll(s) used to cool and solidify the extruded film to be held at from 10 to 90° C., preferably from 20 to 60° C.

The longitudinal stretching, furthermore, is advantageously carried out at below 140° C., preferably at from 125 to 135° C., and the transverse stretching at above 140° C., preferably at from 145 to 160° C.

After the biaxial stretching, if desired, and as mentioned above, one or both surface(s) of the film may be corona- or flame-treated by one of the known methods. For flame treatment with a polarized flame (cf. U.S. Pat. No. 4,622,237), a constant electrical voltage is applied between a burner (negative pole) and a chill roll. The level of voltage applied is from 500 to 3000 V, preferably from 1500 to 2000 V. The voltage applied gives the ionized atoms increased acceleration, and they impact the polymer surface with relatively high kinetic energy. The chemical bonds within the polymer molecule are more easily broken, and free-radical formation proceeds more rapidly. This involves much lower thermal stress on the polymer than is the case in standard flame treatment, and it is possible to obtain films in which the sealing properties of the treated side are even better than those of the untreated side.

For the alternative, corona treatment, the film is passed between two conductors serving as electrodes, and a voltage, usually an alternating voltage (about 10,000 V and 10,000 Hz) applied between the electrodes is sufficiently high to allow corona discharges or spray discharges to take place. The corona discharge or spray discharge ionizes the air above the film surface. It reacts with the molecules of the film surface, so that polar inclusions are produced in the essentially nonpolar polymer matrix. The usual treatment intensities are used, preferably from 38 to 45 mN/m.

The novel sealable coextruded films have, inter alia, lowered sealing temperatures, very low extractables and good organoleptic properties. They also have high gloss values, good adhesive properties and very high transparency. With the aid of the novel process it is possible to produce sealable coextruded films of this type at no great cost for process technology.

The novel sealable coextruded films are particularly suitable as a constituent of packaging.

EXAMPLES

Example 1
Preparation of a Supported Metallocene Catalyst
a) Preparation of the Support Material 1000 g of silica gel (SG 332, particle diameter 50 µm, Grace, baked for 8 hours at 180° C. at reduced pressure (1 mbar)) were suspended in 5 l of toluene under an atmosphere of nitrogen. 7.75 l (6.83 kg) of 1.53 molar methylaluminoxane (MAO) solution (in toluene, Witco) were added at 18° C. over a period of 120 minutes. This was followed by stirring at room temperature for 7 hours and then filtration. The filter cake was washed twice, in each case with 2.5 l of toluene, and this was followed by drying in vacuo.

b) Loading with the Metallocene Complex

The initial charge, in an evacuated vessel, was 1 kg of the MAO-loaded silica gel prepared under a). A solution of 5.8 g (10 mmol) of rac.-dimethylsilylenebis(2-methylbenzindenyl)zirconium dichloride in 1.32 l of 1.53 molar MAO solution (toluene) were added with stirring. The pressure was equalized with $N_2$, followed by thorough mixing for 30 minutes at room temperature. The greatest part of the solvent was then distilled off in vacuo, initially at 20° C. (until no further solvent was distilled over). The temperature was then increased to 55° C. in steps of 5° C., and the catalyst was dried until it remained behind as a free-flowing orange powder.

Comparative Example A
Preparation of Propylene/ethene Copolymers 20 mmol of triisobutylaluminum (TiBA; 10 ml of a 2 molar solution in heptane) were the initial charge in a dry $N_2$-flushed 10 l autoclave. 150 mg of antistat solution (Stadis® 450, Du Pont) and 3500 g of liquid propylene were added. 1020 mg of the supported metallocene catalyst prepared in Example 1 were then injected with $N_2$ via a valve, with stirring at room temperature. The autoclave was then heated to 60° C. and polymerization was carried out for 90 min at this temperature. During the polymerization, ethene was metered in continuously at 117 g per hour: a total of 175 g of ethene (5% by weight). After the reaction time had expired, the polymerization was terminated by discharging the remaining ethene/propylene mixture, and the product was discharged via a bottom valve. 1900 g of polymer granules were obtained (productivity: 1860 g of copolymer/g of catalyst).

The experiment was repeated a further three times using 965, 990 and 1000 mg of the metallocene catalyst prepared in Example 1 (yields: 1850, 2100 and 1870 g of propylene/ethene copolymer). The copolymer from all four experiments was mixed and pelletized. The polymer data measured on the pellets were: $T_m$: 121.6° C.; $X_L$: 2.6% by weight; $M_W$: 223,400 g/mol; $M_w/M_n$: 1.80.

Comparative Example B
Preparation of Propylene/1-butene Copolymers

A propylene/1-butene copolymer was prepared by continuous gas-phase polymerization in a manner corresponding to Example 4 of DE-A 19 533 337, and had the following properties: $C_4$ content: 2.2 mol % (IR spectroscopy); $T_m$: 135.3° C.; $X_L$: 0.6% by weight; $M_W$: 258,860 g/mol; $M_w/M_n$: 1.74.

Example 2
Preparation of a Propylene/ethene/1-butene Terpolymer 20 mmol of triisobutylaluminum (TiBA; 10 ml of a 2 molar solution in heptane) were the initial charge in a dry $N_2$-flushed 10 l autoclave. 150 mg of antistat solution (Stadis® 450, Du Pont) were added and 2000 g of liquid propylene, 40 g of 1-butene (2% by weight) and 40 g of ethene (2% by weight) were then metered in. 790 mg of supported metallocene catalyst of Example 1 were then injected with $N_2$ via a valve at room temperature. The autoclave was then heated to 60° C. and polymerization was carried out for 90 min at this temperature. After the reaction time had expired, the polymerization was terminated by discharging the remaining monomer mixture, and the product was discharged via a bottom valve. This gave 680 g of polymer granules (productivity: 860 g of terpolymer/g of catalyst).

Polymer data: $C_2$ content: 2.6 mol %; $C_4$ content: 0.5 mol % (IR spectroscopy); $T_m$: 119.4° C.; $X_L$: 0.6% by weight; $M_W$: 232,478 g/mol; $M_w/M_n$: 1.70; proportion of regioregular '1-2'-inserted propylene units as given by the formula (1): 99.28; enthalpy of fusion: 79 J/g.

Example 3
Preparation of a Propylene/ethene/1-butene Terpolymer 20 mmol of triisobutylaluminum (TiBA; 10 ml of a 2 molar solution in heptane) were the initial charge in a dry $N_2$-flushed 10 l autoclave. 150 mg of antistat solution (Stadis® 450, Du Pont) were added and 2000 g of liquid propylene and 40 g of 1-butene (2% by weight) were then metered in. 815 mg of supported metallocene catalyst of Example 1 were then injected with $N_2$ via a valve at room temperature. The autoclave was then heated to 60° C. and polymerization was carried out for 90 min at this temperature. During the polymerization, ethene was metered in continuously at 27 g per hour, i.e. a total of 40 g (2% by weight). After the reaction time had expired, the polymerization was terminated by discharging the remaining monomer mixture, and the product was discharged via a bottom valve. This gave 1120 g of polymer granules (productivity: 1370 g of terpolymer/g of catalyst).

Polymer data: $C_2$ content: 2.2 mol %; $C_4$ content: 0.4 mol % (IR spectroscopy); $T_m$: 122.8° C.; $X_L$: 0.5% by weight; $M_W$: 247,345 g/mol; $M_w/M_n$: 1.70; proportion of regioregular '1-2'-inserted propylene units as given by the formula (1): 99.24; enthalpy of fusion: 81 J/g.

For preparing the sealing layer in Example 6, the polymerization described above was repeated six times, and the polymer mixed and pelletized. A measurement on the pellets gave an $M_w$ of 233,520 g/mol and a polydispersity $M_w/M_n$ of 1.64. The fraction extractable in cold n-hexane (in accordance with FDA 177 1520) was 0.4% by weight.

Example 4
Preparation of a Propylene/ethene/1-hexene Terpolymer 20 mmol of triisobutylaluminum (TiBA; 10 ml of a 2 molar solution in heptane) were the initial charge in a dry $N_2$-flushed 10 l autoclave. 150 mg of antistat solution (Stadis® 450, Du Pont) were added and 2000 g of liquid propylene, 40 g of 1-butene (2% by weight) and 40 g of 1-hexene (2% by weight) were then metered in. 905 mg of supported metallocene catalyst of Example 1 were then injected with $N_2$ via a valve at room temperature. The autoclave was then heated to 60° C. and polymerization was carried out for 90 min at this temperature. After the reaction time had expired, the polymerization was terminated by discharging the remaining monomer mixture, and the product was discharged via a bottom valve. This gave 543 g of polymer granules (productivity: 600 g of terpolymer/g of catalyst).

Polymer data: $C_4$ content: 3.5 mol %; $C_6$ content: 1.1 mol % ($^{13}$C-NMR); $T_m$: 124.4° C.; $X_L$: 0.3% by weight; $M_w$: 339,062 g/mol; $M_w/M_n$: 1.84; proportion of regioregular '1-2'-inserted propylene units as given by the formula (1): 99.12; enthalpy of fusion: 79 J/g.

Examples 5 to 7 and Comparative Examples C to E
Production of Coextruded Films

Three-layered biaxially oriented polypropylene films (BOPP films) with A'B'A' layer structure (A': outer layer; B': base layer) were produced by coextrusion followed by stepwise orientation in longitudinal and transverse direction. The overall film thickness was about 20 μm, and that of the outer layer was about 1 μm. For the base layer B', use was made of a propylene homopolymer prepared with the metallocene catalyst described in Example 1 in a continuous gas-phase polymerization at 60° C. and 24 bar. It had a melt flow rate (at 230° C. and 2.16 kg in accordance with DIN 53 735) of 4.0 g/10 min, a melting point of 145° C. and a polydispersity $M_w/M_n$ of 1.9. Before production of the films, all of the polymers were mixed with, respectively, 1000 ppm of Sylobloc® 45, 1000 ppm of Irgafos® 168, 600 ppm of Ca stearate and 500 ppm of Irganox® 1010 and granulated.

The polymer used as outer layer A' in Example 5 according to the invention was the propylene-ethene-1-butene terpolymer prepared in Example 2. In Example 6 according to the invention it was the propylene-ethene-1-butene terpolymer of Example 3, and in Example 7 according to the invention it was the propylene/1-butene/1-hexene terpolymer of Example 4.

The polymer used as outer layer A' in Comparative Example C was the propylene-ethene copolymer of Comparative Example A. In Comparative Example D, the propylene-1-butene copolymer of Comparative Example B was used as outer layer A'. The polymer used as outer layer A' in Comparative Example E was a propylene terpolymer (Novolen® 3520L from Targor GmbH). Novolen® 3520L is a propylene terpolymer which has 4.2% by weight of copolymerized ethene and 1.9% by weight of copolymerized 1-butene, and a melt flow rate of 5 g/10 min at 230° C. and 2.16 kg in accordance with ISO 1133, and had been obtained by gas-phase polymerization of propylene, ethene and 1-butene with the aid of a Ziegler-Natta catalyst, described, inter alia, in U.S. Pat. No. 5,288,824.

In all of the Examples 5 to 7, and in all of the Comparative Examples C to E, the polymer used as base layer B' was the propylene homopolymer described above and prepared with the metallocene catalyst obtained from Example 1.

The properties found on testing the BOPP films of A'B'A' layer structure are listed in Table I below.

Supplementary information

Stadis® 450 from Du Pont is a commercially available product in the form of a mixture of toluene, isopropanol, dodecylbenzene-sulfonic acid, a polyamine, a copolymer of 1-decene and $SO_2$, and also 1-decene.

Sylobloc® from Grace is an antiblocking agent based on $SiO_2$.

Irganox® 1010 from Ciba-Geigy is pentaerythritol tetrakis-[3-(3,5-bis(1,1-dimethylethyl)-4-hydroxyphenyl) propionate], and Irgafos® 168 is tris(2,4-bis-tert-butylphenyl) phosphite, likewise from Ciba-Geigy.

The properties listed in the examples were determined in the following way:

| | |
|---|---|
| Comonomer content and/or proportion of '1–3'-inserted propene units: | by $^{13}$C NMR or by infrared spectroscopy |
| Melting point ($T_M$): | by DSC (differential scanning calorimetry) |

Xylene-soluble Fractions (XL)

500 ml of distilled xylene (isomer mixture) were placed in a 1 liter three-necked flask with stirrer, reflux condenser and thermometer, and heated to 100° C. The polymer was added at this temperature, followed by heating to the boiling point of the xylene and 60 min under reflux. The heat supply was then stopped, followed by cooling to 5° C. within a period of 20 min using a cooling bath and then reheating to 20° C. This temperature was maintained for 30 min. The precipitated polymer was filtered off, and exactly 100 ml of the filtrate was placed in a 250 ml single-necked flask which had been previously tared. The solvent was removed from this by rotary evaporator. The resultant residue was then dried for 2 hours at 80° C./200 Torr in a vacuum drying cabinet, and weighed after cooling.

The xylene-soluble fraction is calculated from $$X_L = \frac{g \times 500 \times 100}{G \times V}$$

$X_L$=xylene-soluble fraction in %
g=weight measured
G=starting weight of product
V=volume of filtrate used

| | |
|---|---|
| Molar mass (number average) $M_N$: | by gel permeation chromatography |
| Molar mass (weight average) $M_W$: | by gel permeation chromatography |
| Polymer dispersity $M_W/M_N$: | by gel permeation chromatography |
| Melt flow rate (MFR): | in accordance with ISO 1133 |
| Enthalpy of fusion: | by DSC at a heating rate of 20° C./min |
| Haze of the film: | in accordance with ASTM D 1003 |
| Gloss at 20° C. and 60° C.: | in accordance with DIN 67530 |
| Sealing temperature: | hot-sealed specimens were produced using a sealing apparatus. The sealing temperature was increased in steps of 1° C. (Sealing pressure: 0.35 N/cm², sealing time: 0.5 s). After cooling, a test strip of 15 mm width was cut from the seal seam and a tensile test machine was used to measure the opening force required. The sealing temperature given is that at which the opening force required is at least 7.5 N/15 mm. |
| Printing ink adhesion, metal adhesion: | to evaluate the adhesion of printing inks or metals, the films were firstly corona-treated in a manner corresponding to that of US-A 4,622,237 and, 14 days later, either printed or metalized. The adhesion of ink or | metal was evaluated by an adhesive tape test. The adhesion was evaluated as very good if no ink or no metal could be pulled away with adhesive tape, and as poor if significant amounts of ink or of metal were pulled away.

($T_M$), determined from the DSC peak, of less than 135° C. and a weight-average molar mass ($M_W$) greater than 80,000 g/mol.

4. A coextruded film as claimed in claim 1, where the propylene terpolymer of the outer layer has a xylene-soluble fraction (XL) in % by weight which satisfies the following expression (2)

$$X_L \leq 1411.21 \exp(-0.0591\, T_M) - 0.05 \tag{2}$$

where $T_M$ is the melting point in °C.

TABLE I

Properties of the coextruded films

| Examples and comparative examples | Example 5 | Example 6 | Example 7 | Comparative Example C | Comparative Example D | Comparative Example E |
|---|---|---|---|---|---|---|
| Outer layer | from Ex. 2 | from Ex. 3 | from Ex. 4 | from Comparative Example A | from Comparative Example B | Novolen 3520 L |
| Film haze (ASTM D 1003) | 0.2 | 0.2 | 0.1 | 0.2 | 0.2 | 0.5 |
| Gloss (20°) (DIN 67 530) | 126 | 124 | 129 | 123 | 128 | 102 |
| Gloss (60°) (DIN 67 530) | 148 | 155 | 153 | 147 | 149 | 124 |
| Printing ink adhesion | very good | very good | very good | very good | very good | moderate |
| Metal adhesion | very good | very good | very good | very good | very good | bad |
| $T_m$ of the sealing layer [° C.] | 119.4 | 122.8 | 124.4 | 121.6 | 135.3 | 130.2 |
| $X_L$ of the sealing layer [% by weight] | 0.6 | 0.5 | 0.3 | 2.6 | 0.6 | about 8 |
| Sealing temperature [° C.] | 105 | 109 | 110 | 111 | 124 | 120 |
| Δ ($T_m$-sealing temp.) [° C.] | 14.4 | 13.8 | 14.4 | 10.6 | 11.3 | 10.8 |

Table I shows, inter alia, that when compared with coextruded films (Comparative Examples C to E) known from the prior art the novel sealable coextruded films have, inter alia, improved gloss, improved adhesion, a lower sealing temperature and smaller xylene-soluble fractions.

We claim:

1. A sealable coextruded film made from at least one outer layer and from at least one base layer, where the outer layer is composed of a propylene terpolymer, wherein the propylene terpolymer comprises from 80 to 99.5 mol % of structural units derived from propylene, from 0.2 to 15 mol % of structural units derived from ethene or from a $C_4$–$C_6$ 1-olefin (I) and from 0.3 to 15 mol % of structural units derived from another $C_4$–$C_{12}$ 1-olefin (II) different from the $C_4$–$C_6$ 1-olefin (I), and where the propylene terpolymer has been prepared using metallocene catalysts.

2. A coextruded film as claimed in claim 1, where the propylene terpolymer of the outer layer has a proportion of regioregular '1-2'-inserted propylene units given by the formula (1)

$$\frac{['1\text{-}2']}{['1\text{-}2'] + ['2\text{-}1'] + ['1\text{-}3']} \tag{1}$$

of more than 0.97.

3. A coextruded film as claimed in claim 1, where the propylene terpolymer of the outer layer has a melting point 5. A coextruded film as claimed in claim 1, where the propylene terpolymer of the outer layer has a polydispersity ($M_W/M_N$) of less than 2.25.

6. A coextruded film as claimed in claim 1, where the base layer is composed of a polyolefin.

7. A coextruded film as claimed in claim 6, where the base layer is composed of polypropylene.

8. A coextruded film as claimed in claim 1, which is composed of at least one outer layer of thickness from 0.1 to 5 μm and of at least one base layer of thickness from 1 to 100 μm.

9. A coextruded film as claimed in claim 1, which has been built up from three layers, of which the upper and the lower layer are both outer layers and the layer between these is a base layer.

10. A process for producing a coextruded film as claimed in claim 1, which comprises coextruding, through a flat-film die, the melts corresponding to the individual layers of the film, taking off the resultant coextruded film for solidification on at least one roll, and then biaxially stretching, heat-setting and winding up the film.

11. A process as claimed in claim 10, wherein the biaxially stretched film, after heat-setting, is then corona- or flame-treated.

12. Packaging comprising at least one coextruded film as claimed in claim 1.

* * * * *